(12) United States Patent
Shiohara

(10) Patent No.: US 11,687,293 B2
(45) Date of Patent: Jun. 27, 2023

(54) INFORMATION PROCESSING APPARATUS AND CONTROL METHOD

(71) Applicant: CANON KABUSHIKI KAISHA, Tokyo (JP)

(72) Inventor: Tetsuya Shiohara, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/452,097

(22) Filed: Jun. 25, 2019

(65) Prior Publication Data
US 2020/0004471 A1 Jan. 2, 2020

(30) Foreign Application Priority Data
Jun. 29, 2018 (JP) .............................. JP2018-125043

(51) Int. Cl.
*G06F 15/00* (2006.01)
*G06F 3/12* (2006.01)

(52) U.S. Cl.
CPC ............ *G06F 3/1205* (2013.01); *G06F 3/123* (2013.01); *G06F 3/125* (2013.01); *G06F 3/1256* (2013.01)

(58) Field of Classification Search
CPC ........ G06F 3/1205; G06F 3/123; G06F 3/125; G06F 3/1256

USPC ........................................................ 358/1.13
See application file for complete search history.

(56) References Cited

U.S. PATENT DOCUMENTS

| | | | |
|---|---|---|---|
| 2009/0290185 A1* | 11/2009 | Shiohara | G06F 3/1208 358/1.13 |
| 2010/0238494 A1 | 9/2010 | Araki | |
| 2011/0010719 A1* | 1/2011 | Watanabe | G06F 21/78 718/102 |
| 2014/0293312 A1 | 10/2014 | Fukasawa | |
| 2014/0368881 A1* | 12/2014 | Kawaura | G06F 3/1204 358/1.15 |
| 2017/0024173 A1* | 1/2017 | Iwamoto | G06F 3/1205 |

FOREIGN PATENT DOCUMENTS

JP 2017-016480 A 1/2017

\* cited by examiner

*Primary Examiner* — Mark R Milia
(74) *Attorney, Agent, or Firm* — Canon U.S.A., Inc. IP Division

(57) ABSTRACT

An information processing apparatus having print data generation software and print software installed thereon, the print data generation software having been obtained at a first timing, the print software being different from the print data generation software and obtained at a second timing different from the first timing, launches the print software in a case where print setting information set by a user using a setting screen provided by the print software includes a setting that matches a launch condition for the print software.

19 Claims, 9 Drawing Sheets

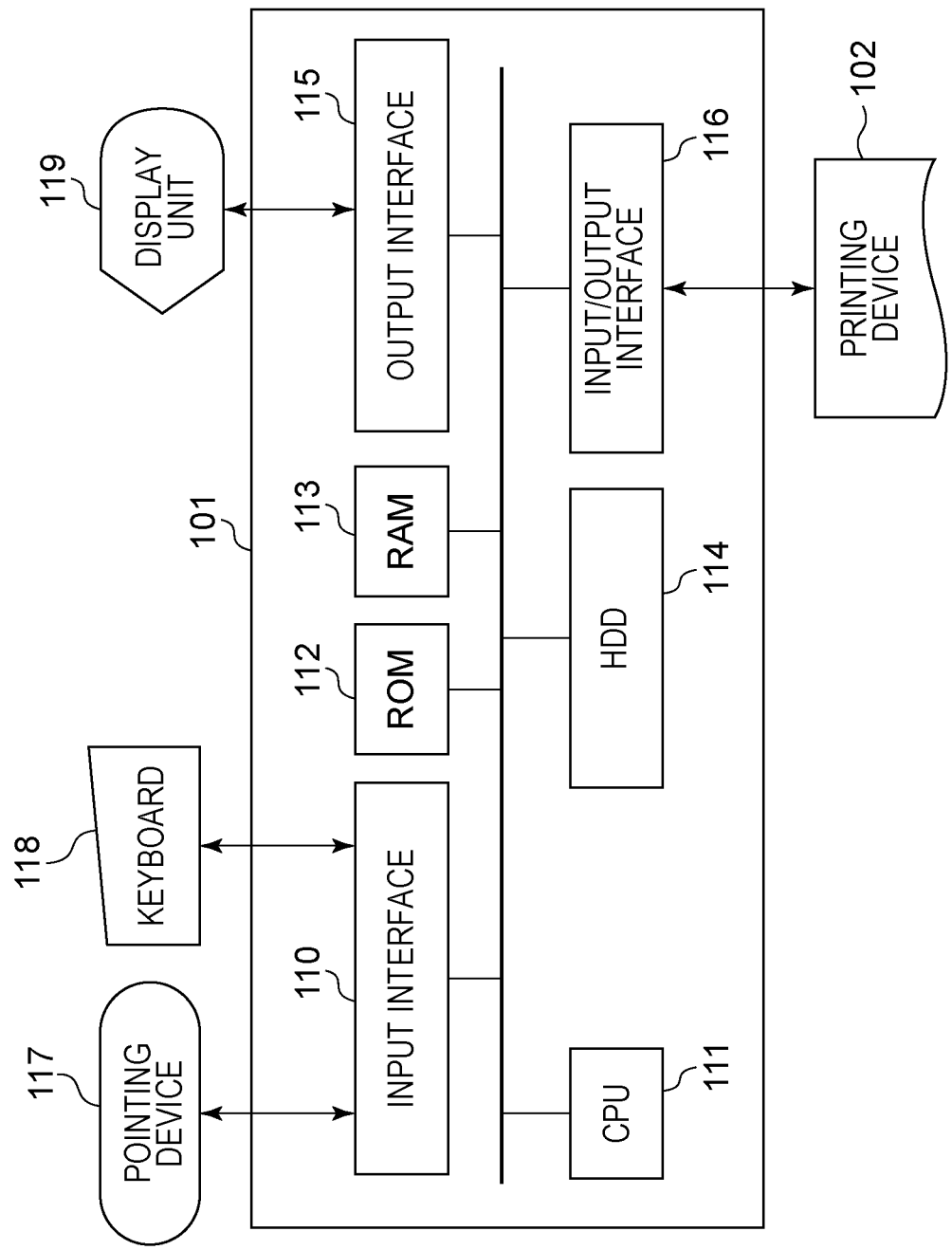

FIG. 3

| Basic Settings | |
|---|---|
| Paper Type | Normal Paper ∨ |
| Paper Size | A4 ∨ |
| Paper Feed | Automatic Selection ∨ |
| Resolution | 600x600 ∨ |

Basic Settings

| | |
|---|---|
| Orientation | ● Portrait   ○ Landscape |
| Borderless | OFF |
| Collate | ON |
| Double-sided Printing | OFF ∨ |
| Page Layout Printing | OFF ∨ |
| Print Preview | OFF ∨ |
| Launch of Extended Application | OFF ∨ |

OK

FIG. 4
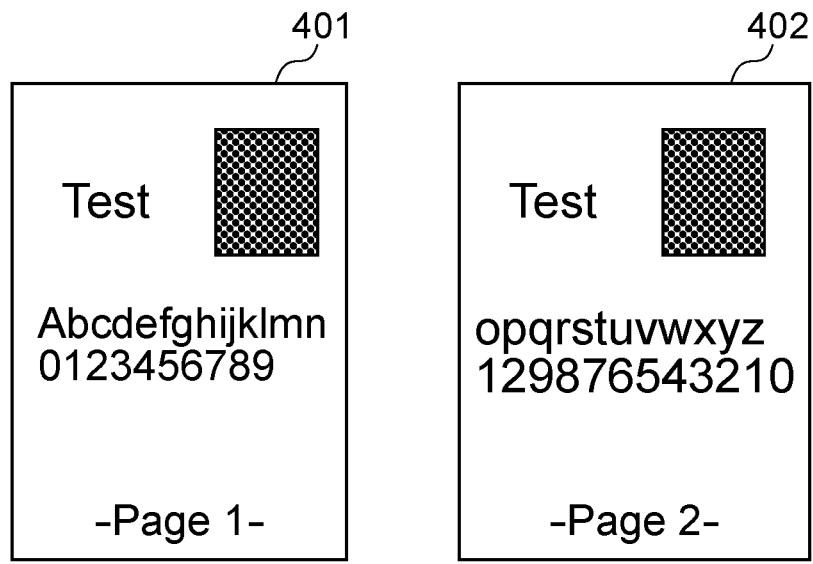
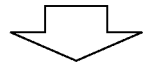
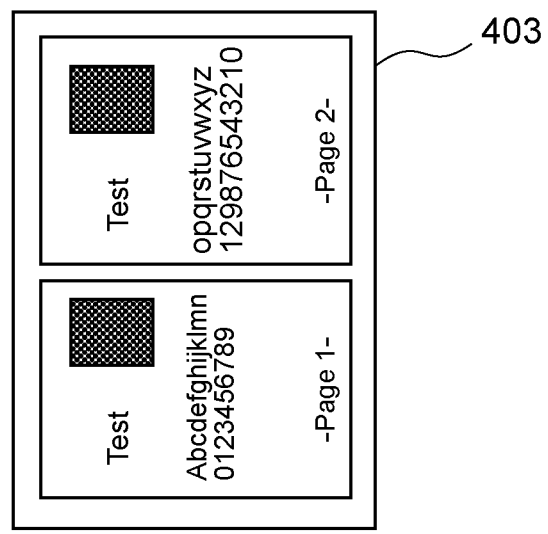

| Feature | Options | Timing |
|---|---|---|
| JobNUpAllDocumentsContiguously | PagesPerSheet_2/PagesPerSheet_4 | 1 |
| JobPreview | ON | 2 | ity
INFORMATION PROCESSING APPARATUS AND CONTROL METHOD

BACKGROUND OF THE INVENTION

Field of the Invention

The present invention relates to an information processing apparatus and a control method.

Description of the Related Art

For Windows (registered trademark), a special-purpose application for extending the features of a printer driver can be provided. This application is called Windows Store Device App (WSDA). When a vendor that offers a printing device provides WSDA, the vendor can customize a print setting screen used when printing is performed from a specific application (Japanese Patent Laid-Open No. 2017-16480).

Recently, there has been a demand for a further increase in convenience of print processing.

SUMMARY OF THE INVENTION

In view of the above-described issue, the present invention is made to further increase convenience of print processing.

The present invention provides an information processing apparatus having print data generation software and print software installed thereon, the print data generation software having been obtained at a first timing, the print software being different from the print data generation software and obtained at a second timing different from the first timing, the information processing apparatus including: an associating unit configured to associate the print data generation software with the print software; an identifying unit configured to identify print setting information set by a user using a setting screen provided by the print software; and a control unit configured to launch the print software in a case where the identified print setting information includes a setting that matches a launch condition for the print software, and to suppress launch of the print software in a case where the identified print setting information does not include a setting that matches a launch condition for the print software. The print data generation software associated with the print software is configured to generate print data based on the print setting information set by using the setting screen provided by the print software.

Further features of the present invention will become apparent from the following description of embodiments with reference to the attached drawings.

BRIEF DESCRIPTION OF THE DRAWINGS

FIG. 1 is a block diagram illustrating a hardware configuration of a print system.

FIG. 3 is a schematic diagram for describing a screen used to perform print setting.

FIG. 4 is a schematic diagram for describing page layout printing.

DESCRIPTION OF THE EMBODIMENTS

Figure 2A:
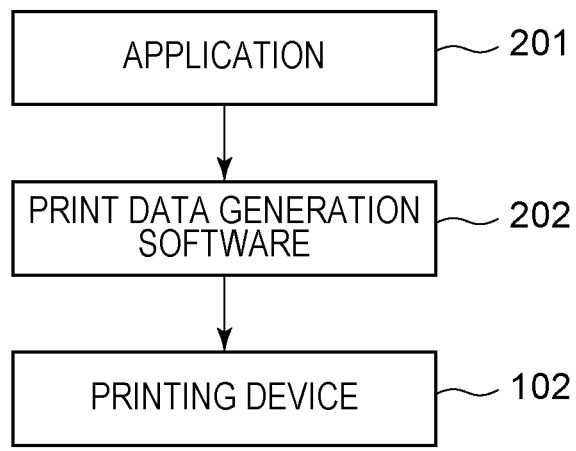
FIGS. 2A and 2B are block diagrams for describing data flows in printing.

Hereinafter, embodiments of the present invention will be described in detail with reference to the attached drawings. The following embodiments are not intended to limit the present invention described in the claims, and all combinations of features described in the embodiments are not necessarily essential to solutions of the present invention. Note that the same constituent elements are assigned the same reference numerals, and descriptions thereof will be omitted. Each of the embodiments of the present invention described below can be implemented solely or as a combination of a plurality of the embodiments or features thereof where necessary or where the combination of elements or features from individual embodiments in a single embodiment is beneficial.

First Embodiment

FIG. 1 is a block diagram illustrating a hardware configuration of a print system. In this figure, a host computer 101 is an example of an information processing apparatus and includes an input interface 110, a central processing unit (CPU) 111, a read-only memory (ROM) 112, a random access memory (RAM) 113, a hard disk drive (HDD) 114, an output interface 115, and an input/output interface 116. To the input interface 110, input devices, such as a keyboard 118 and a pointing device 117, are connected. To the output interface 115, a display device, such as a display unit 119, is connected.

In the ROM 112, an initialization program is stored. In the HDD 114, a group of application programs, an operating system (OS), a print data generation application, various types of data, and so on are stored. The RAM 113 is used as, for example, a work memory that is used when various programs stored in the HDD 114 are executed.

In this embodiment, the CPU 111 performs processing in accordance with procedures in the programs stored in the HDD 114 to thereby execute features described below in the host computer 101 and processing based on flowcharts described below. A printing device 102, which is a device, is connected to the host computer 101 via the input/output interface 116. Here, the host computer 101 and the printing device 102 are separately configured; however, these may be configured as one information processing apparatus. As the printing device 102, for example, an inkjet printer that performs printing by ejecting ink onto paper is assumed, and a description is given. However, printing may be performed with other methods (for example, an electrophotographic method). The host computer 101 may be a desktop computer, a smartphone, or a laptop computer.

Figure 2B:
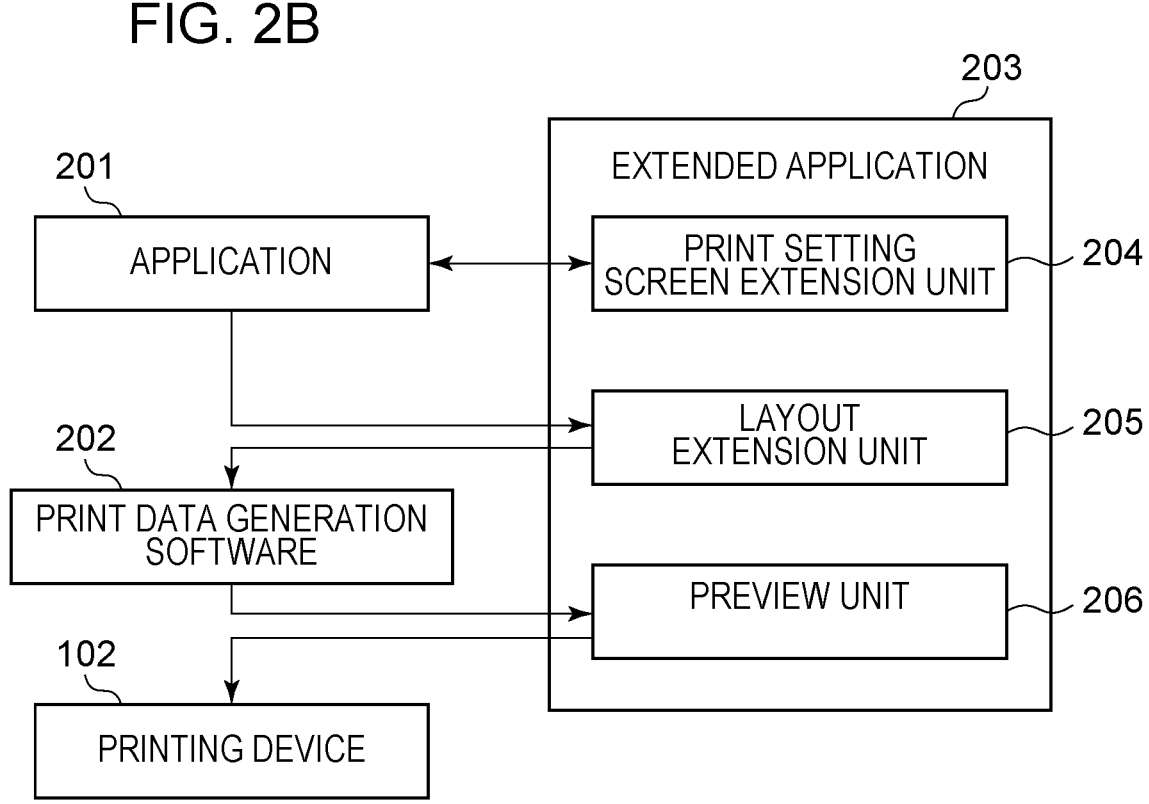

FIGS. 2A and 2B are diagrams illustrating data flows in printing. FIG. 2A is a diagram illustrating a data flow in a case where an extended application 203 is not associated with an application 201, print data generation software 202, or the printing device 102. A user gives a print instruction from the application 201. The application 201 is software that creates contents to be printed and, for example, is a word processing application or a spreadsheet application. In a case of giving a print instruction, the user performs a setting process using a print setting screen provided by the OS or the print data generation software 202. In this setting process, the print data generation software 202 generates print setting information. The print setting information includes settings corresponding to set values that are set by using the print setting screen. The print setting information may be called PrintTicket. The OS generates intermediate data (also called input data) on the basis of application data output from the application 201 in accordance with the print instruction and passes the intermediate data to the print data generation software 202. The data output from the application 201 for printing is data in the Graphics Device Interface format (data in the GDI format) or data in the XML Paper Specification format (data in the XPS format). The print data generation software 202 generates print data that can be interpreted by the printing device 102 from the intermediate data on the basis of the print setting information set by the user and transmits the print data to the printing device 102. The print data generation software 202 generates print data that can be used in print devices from multiple vendors. That is, a printing device from vendor A can use print data generated by the print data generation software 202 to perform printing. Further, a printing device from vendor B can use print data generated by the print data generation software 202 to perform printing. The printing device 102 performs printing on paper on the basis of the print data transmitted from the print data generation software 202.

FIG. 2B is a diagram illustrating a data flow in a case where the extended application 203 is associated with the print data generation software 202. The print data generation software 202 is software that is included in advance in the OS. That is, when the OS is installed on the host computer 101, the print data generation software 202 can be used. On the other hand, the extended application 203 is software that is not included in advance in the OS. Therefore, the user needs to operate the host computer 101 to download, from a server via a network, and install the extended application 203. In a case where the printing device 102 is connected to the host computer 101, the CPU 111 obtains device identification information from the printing device 102. Then, the CPU 111 may obtain, from a server via a network, and install the extended application 203 that corresponds to the obtained device identification information. That is, the print data generation software 202 and the extended application 203 are retained in the host computer 101 as separate files. The print data generation software 202 and the extended application 203 may be updated and upgraded, and this update process is performed at separate timings. That is, a timing at which the print data generation software 202 is obtained by the host computer 101 is different from a timing at which the extended application 203 is obtained by the host computer 101. Further, a trigger for the host computer 101 to obtain the print data generation software 202 is different from a trigger for the host computer 101 to obtain the extended application 203. In a case where the extended application 203 is installed, the OS associates the print data generation software 202 and the extended application 203 with each other. The extended application 203 described in this embodiment includes a print setting screen extension unit 204, a layout extension unit 205, and a preview unit 206.

The extended application 203 may stop running each time processing by each unit ends. In this case, the OS launches the extended application 203 each time a request for using each unit is received. Another form may be employed in which, for example, the OS stops the extended application 203 that is running when processing by the print setting screen extension unit 204 ends but the OS keeps the extended application 203 running even when processing by the layout extension unit 205 ends.

Now, the layout extension unit 205 and the preview unit 206 are described. The layout extension unit 205 performs a layout process on the basis of intermediate data before processing by the print data generation software 202. For example, the layout extension unit 205 provides a page layout print feature (also called N in 1 printing) of arranging and printing a plurality of pages on a side of one sheet. The preview unit 206 can perform at least one of display and editing of print data generated by the print data generation software 202. Each of the units of the extended application 203 can display a user interface (UI) but need not display a UI. For example, the layout extension unit 205 may be configured such that the layout extension unit 205 does not display a UI but only edits intermediate data and outputs the edited intermediate data to the print data generation software 202. In a case where the layout extension unit 205 can display a UI, for example, the layout extension unit 205 may display a preview screen that includes a preview image and a setting area for changing print setting information on the basis of the intermediate data. The configuration of the extended application 203 for implementing the present invention is not limited to a configuration having all of the above-described features and may be a configuration having only some of the features or a configuration having other features, as a matter of course. The extended application 203 may be simply called print software. As described above, it can be said that the extended application 203 has at least one of the feature of displaying the setting screen, the feature of editing input data to be input to the print data generation software 202, and the feature of displaying print data.

The user gives a print instruction from the application 201. At this time, the user performs a setting process using the print setting screen provided by the print setting screen extension unit 204 of the extended application 203. In this setting process, the print setting screen extension unit 204 generates print setting information. The details of this print setting feature will be described below with reference to FIG. 3.

The OS generates, in accordance with a print instruction, intermediate data on the basis of application data and print setting information and launches the layout extension unit 205 of the extended application 203. The intermediate data includes drawing data corresponding to contents to be printed and the print setting information. The OS generates, for example, data in the XPS format as the intermediate data on the basis of GDI data output from the application 201. In a case where the application 201 outputs data in the XPS format as the application data, the OS may pass the data in the XPS format to the layout extension unit 205 as is. In a case where the application 201 outputs data in the XPS format as the application data, the OS may modify the data in the XPS format, which is the application data, to generate data in the XPS format. The layout extension unit 205 edits the drawing data on the basis of the drawing data included in the generated intermediate data and the print setting information generated by using, for example, a screen illustrated in FIG. 3. The layout extension unit 205 outputs the edited drawing data to the print data generation software 202. The print data generation software 202 generates and outputs print data that can be interpreted by the printing device 102 on the basis of the print setting information generated in accordance with a setting operation by the user and the edited drawing data. Subsequently, the OS launches the preview unit 206 of the extended application 203. The preview unit 206 obtains the print data generated by the print data generation software 202 and displays a print preview. After the user has confirmed with the print preview that a desired print result can be obtained, the user uses a UI of the print preview to give a print start instruction. When receiving the print start instruction from the user, the preview unit 206 outputs the print data. The print data output from the preview unit 206 is transmitted to the printing device 102. The printing device 102 performs printing on paper on the basis of the print data transmitted from the host computer 101. With the above-described configuration, the layout feature and the print preview feature not provided by the print data generation software 202 are made available to the user by the extended application 203.

FIG. 3 illustrates an example of the print setting screen provided by the print setting screen extension unit 204 of the extended application 203. When performing printing from the application 201, the user uses this screen to set print setting information. In a case where the extended application 203 is not associated with the print data generation software 202, etc., a default print setting screen provided by the OS or the print data generation software 202 is generally used. On the default print setting screen, only print setting information corresponding to features provided by the print data generation software 202 can be set. On the other hand, on the print setting screen provided by the extended application 203, print setting information corresponding to the extended features provided by the extended application 203 can also be set. In the example illustrated in FIG. 3, setting for page layout printing provided by the layout extension unit 205 and setting for the print preview feature provided by the preview unit 206 can be performed.

FIG. 4 is a diagram schematically illustrating the page layout print feature provided by the layout extension unit 205 of the extended application 203. In page layout printing, layout is done such that a plurality of pages in intermediate data based on application data are arranged on a side of one sheet. In the example illustrated in FIG. 4, two-page printing (2 in 1) is set, and the layout extension unit 205 generates drawing data 403 in which two consecutive pages 401 and 402 are arranged on a side of one sheet. In addition to two-page printing, a setting for arranging a larger number of pages on a side of one sheet is available. It is assumed that the layout extension unit 205 in this embodiment has a layout feature for two-page printing and four-page printing as the page layout print feature, and the following description is given.

Figure 5:
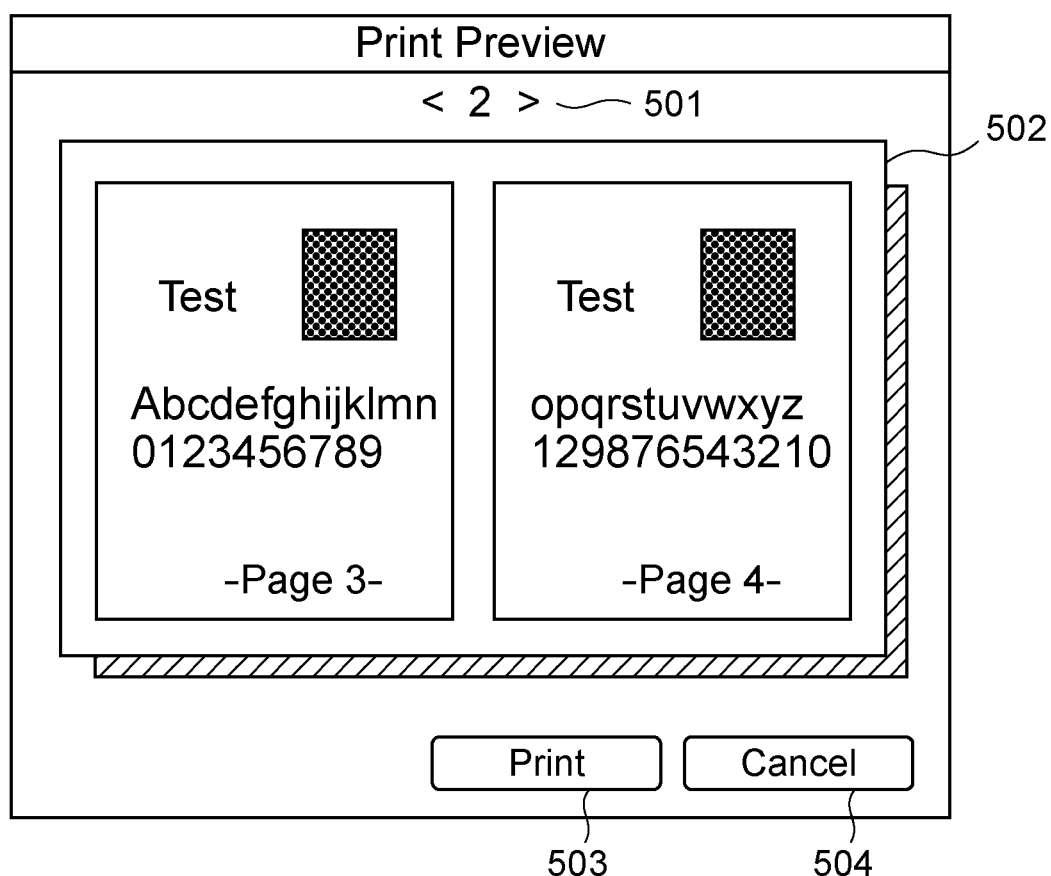
FIG. 5 is a schematic diagram of a user interface of a print preview feature.

FIG. 5 illustrates an example of a print preview screen provided by the preview unit 206 of the extended application 203. A display item 501 is used to change pages to be displayed on a print preview. The user can operate the display item 501 to change pages to be displayed and check the total number of pages to be printed based on the current print data and print settings. A display item 502 is a print preview screen for displaying an image of a print result of specified pages. A display item 503 is a button for starting printing. A display item 504 is a cancel button and, when the user presses this button, subsequent print processing is cancelled. The preview image illustrated in FIG. 5 corresponds to contents generated by the application 201.

A vendor that offers the printing device 102 can extend the features of the print data generation software 202 by using the extended application 203. However, when the extended application 203 is associated with the print data generation software 202 and the extended application 203 is launched each time printing is performed, the total time taken to perform printing may increase, which causes concern. Accordingly, the user performs launch setting for the extended application 203 to switch between launch and non-launch of the extended application 203, so that print processing is appropriately performed.

That is, the user sets ON or OFF as the launch setting of the extended application 203. For example, the screen illustrated in FIG. 3 may be used to set ON or OFF as the launch setting of the extended application 203. Alternatively, the user may set ON or OFF as the launch setting of the extended application 203 by using another application before using the extended application 203. The OS checks the launch setting of the extended application 203 and launches the extended application 203 only in a case where ON is set. Accordingly, the user can select whether to use the extended application 203. With this mechanism, in a case where the user does not need the extended features provided by the extended application 203, the user sets the setting to OFF, so that an increase in the total time taken to perform printing can be suppressed.

It is desirable to launch the extended application 203 only in a case where the user wants to use the features provided by the extended application 203. For example, in a case where the extended application 203 provides the print preview feature, the extended application 203 is to be launched only in a case where the user gives a print instruction in a state where ON is set for the print preview setting on the screen illustrated in FIG. 3. For this, a source that launches the extended application 203 needs to know whether to launch the extended application 203 for what setting in print setting information (hereinafter, the source that launches the extended application 203 is assumed to be the OS, and a description is given). Accordingly, a configuration is described in which the extended application 203 registers launch conditions, and the OS launches the extended application 203 in a case where the registered launch conditions are met.

To realize this configuration, a CUSTOM setting for which launch determination is performed on the basis of print setting information is first added to the above-described launch setting of the extended application 203. In a case where CUSTOM is selected as the launch setting, the OS determines whether to launch the extended application 203 on the basis of the registered launch conditions.

Figures 6, 7:
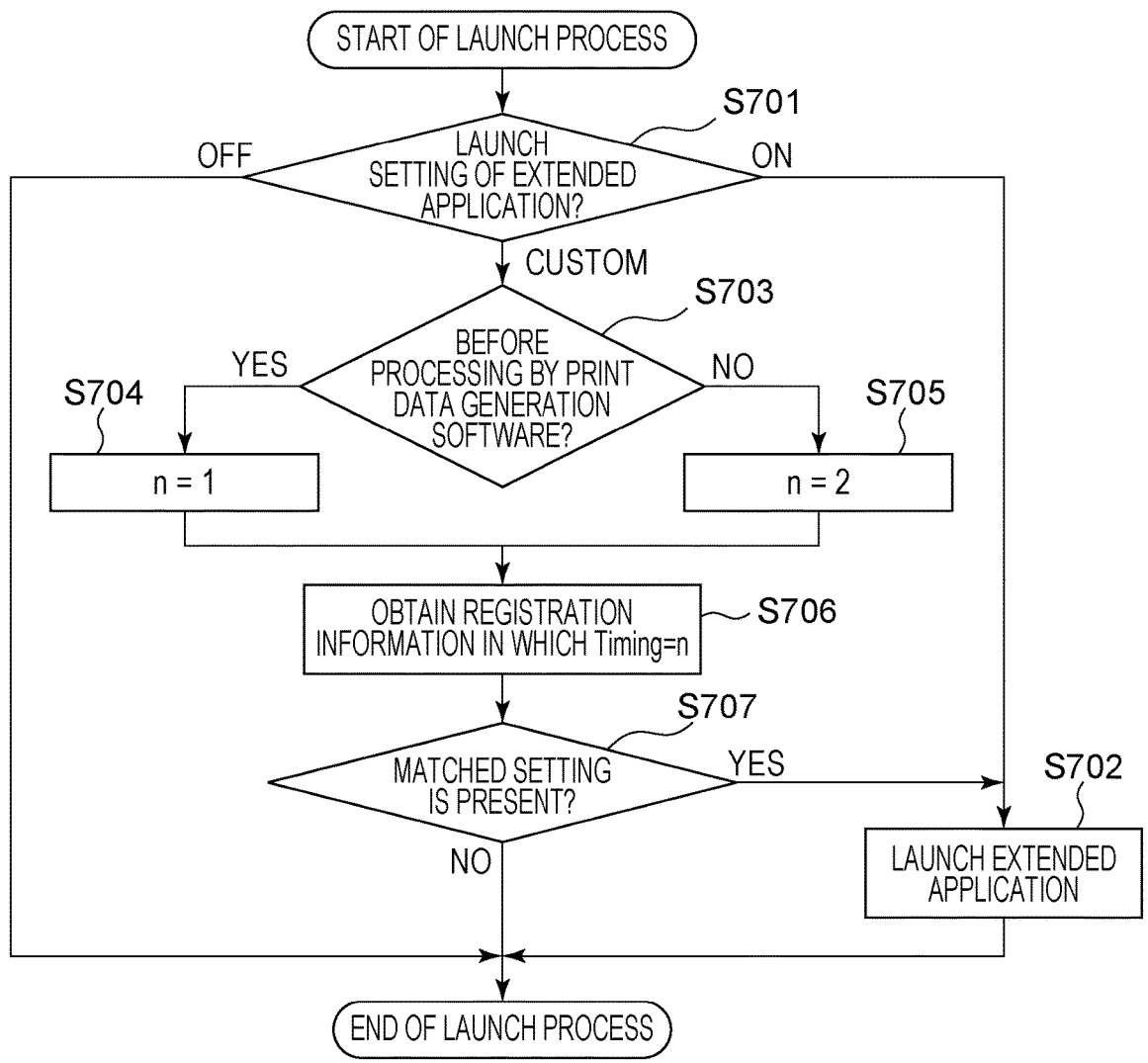
FIG. 6 is a diagram illustrating an example of registration information regarding launch conditions.
FIG. 7 is a flowchart of a launch process for an extended application in a first embodiment.

FIG. 6 is a diagram illustrating an example of registration information regarding the launch conditions. In this embodiment, the extended application 203 provides the page layout printing provided by the layout extension unit 205 and the print preview feature provided by the preview unit 206. The user can use the print setting screen extension unit 204 to perform setting for the page layout printing and the print preview for print settings that are associated with a print job.

When the extended application 203 is associated with the print data generation software 202, the extended application 203 registers print setting information based on which launch of the extended application 203 is triggered. The timing at which the information is registered is not limited to the timing at which the extended application 203 is associated with the print data generation software 202. The user can change the information at any timing using the extended application 203, and the timing at which the launch condition information is registered is not limited.

As the registration information, three types of information, namely, "Feature" that indicates a target feature, "Options" that includes a list of set items for which the extended application 203 is to be launched if the items are set, and "Timing" that indicates the launch timing, are present. The numerical value of "Timing" is associated with a launch timing. In a case where the numerical value is equal to 1, the extended application 203 is to be launched before launch of the print data generation software 202. In a case where the numerical value is equal to 2, the extended application 203 is to be launched after launch of the print data generation software 202. In the example illustrated in FIG. 6, an information item is registered so that, in a case where "JobPreview" setting corresponding to the print preview feature is set to ON, the extended application 203 is to be launched after launch of the print data generation software 202. Further, an information item is registered so that, in a case where two-page printing (PagesPerSheet_2) or four-page printing (PagesPerSheet_4) is set for "Feature" of "JobNUpAllDocumentsContiguously" corresponding to the page layout print setting, the extended application 203 is to be launched before launch of the print data generation software 202.

The registration information regarding the launch conditions described in this embodiment is an example for realizing the configuration, and the content of the registration information is not limited to the above-described information. For example, in a case where a setting is present for which the extended application 203 needs to be launched at both the timing before and the timing after launch of the print data generation software 202 in addition to the above-described settings, a setting may be provided as "Timing" for which the extended application 203 is to be launched at both the timing before and the timing after launch of the print data generation software 202. In a case where the extended application 203 is to be launched only before launch of the print data generation software 202 or only after launch of the print data generation software 202, setting of "Timing" itself might not be necessary.

FIG. 7 is a flowchart regarding control of a launch process for the extended application 203 in the first embodiment. In this embodiment, a description is given under the assumption that the OS is responsible for launch of the extended application 203; however, a configuration may be actually employed in which a launch module that is included in the OS is present. The flowchart illustrated in FIG. 7 starts, for example, in accordance with a print instruction given by the user using the application 201 after the user has set print setting information using the screen illustrated in FIG. 3 (that is, an instruction for causing the OS to generate intermediate data). The flowchart illustrated in FIG. 7 also starts in response to the print data generation software 202 outputting print data.

First, the OS checks the launch setting of the extended application 203 (S701). As the launch setting of the extended application 203, any of the three settings, namely, ON, OFF, and CUSTOM, can be set. For example, as the options for "Launch of Extended Application" on the setting screen illustrated in FIG. 3, ON, OFF, and "automatic" are present. In a case where ON is selected for "Launch of Extended Application" using the screen illustrated in FIG. 3, determination in S701 results in ON, and in a case where OFF is selected, determination in S701 results in OFF. On the other hand, in a case where "automatic" is selected, determination in S701 results in CUSTOM. In a case where the launch setting of the extended application 203 is ON, the flow proceeds to S702, and the OS launches the extended application 203. In a case where the launch setting of the extended application 203 is OFF, the OS does not launch the extended application 203, and the launch process ends. In a case where the OS does not launch the extended application 203, the OS inputs intermediate data to the print data generation software 202 to output print data to the printing device 102 as in FIG. 2A.

In a case where the launch setting of the extended application 203 is CUSTOM, it is determined whether the launch timing is before processing by the print data generation software 202 (S703), and a numerical value that corresponds to "Timing" to be checked in the launch condition information is saved as a variable n. Determination in S703 is performed on the basis of whether the flowchart illustrated in FIG. 7 starts in accordance with a print instruction given by the user using the application 201 or the flowchart starts in response to the print data generation software 202 outputting print data.

In a case where the flowchart illustrated in FIG. 7 starts in accordance with a print instruction given by the user using the application 201, the OS determines that the launch timing is before processing by the print data generation software 202, and saves 1 as the variable n (S704). On the other hand, in a case where the flowchart illustrated in FIG. 7 starts in response to the print data generation software 202 outputting print data, the OS determines that the launch timing is after processing by the print data generation software 202, and saves 2 as the variable n (S705). Next, the OS obtains, from the launch condition information, an information item in which "Timing" matches the value of n saved in S704 or S705 (S706). For example, in a case where it is determined in S703 that the launch timing is before processing by the print data generation software 202, 1 is saved as the variable n in S704. Then, an information item in which "Timing" is set to 1 is obtained in S706 from the registration information regarding the launch conditions illustrated in FIG. 6. That is, the information item including "JobNUpAllDocumentsContiguously" and "PagesPerSheet_2/PagesPerSheet_4" is obtained.

Next, the OS identifies the print setting information set by the user, compares the print setting information with the information item in the launch condition information obtained in S706, and checks whether a setting that matches the information item in the launch condition information is present in the print setting information (S707). In a case where the launch conditions illustrated in FIG. 6 are registered, the OS checks whether the set value of "JobNUpAllDocumentsContiguously" in the print setting information is "PagesPerSheet_2" or "PagesPerSheet_4". In a case where it is determined that a matched setting is present in the print setting information, the flow proceeds to S702, and the OS launches the extended application 203. In the example illustrated in FIG. 6, "Timing" is set to 1 in only one information item. However, there may be a case where the layout extension unit 205 has a plurality of layout settings and the layout settings have respective set values. In this case, the OS makes a comparison with all of the registered information items and, if at least one matched setting is present, the flow proceeds to S702, and the OS launches the extended application 203. In a case where a matched setting is not present in the print setting information as a result of comparison with all of the information items in the launch conditions, the OS does not launch the extended application 203, and the launch process ends. That is, in this embodiment, in a case where the extended application 203 is launched before the print data generation software 202 generates print data, the extended application 203 edits intermediate data (input data).

For example, in a case where it is determined that the launch timing is after processing by the print data generation software 202, 2 is saved as the variable n in S705. Then, an information item in which "Timing" is set to 2 is obtained in S706 from the registration information regarding the launch conditions illustrated in FIG. 6. That is, the information item including "JobPreview" and "ON" is obtained. Next, the OS checks the print setting information set by the user, compares the print setting information with the information item in the launch condition information obtained in S706, and checks whether a setting that matches the information item in the launch condition information is present in the print setting information (S707). In a case where the launch conditions illustrated in FIG. 6 are registered, the OS checks whether the set value of "Preview" in the print setting information is ON. In a case where it is determined that a matched setting is present in the print setting information, the flow proceeds to S702, and the OS launches the extended application 203. That is, in this embodiment, in a case where the extended application 203 is launched after the print data generation software 202 has generated print data, the extended application 203 displays a preview image using the print data.

As described above, in this embodiment, the OS is allowed to launch the extended application 203 on the basis of the registered launch condition information only in a case where the features provided by the extended application 203 are to be used. Accordingly, in a case of printing in which the user does not use the extended features provided by the extended application 203, a decrease in performance caused by association of the extended application 203 can be made smaller.

In the process illustrated in FIG. 7, the case where, as the launch setting of the extended application 203, any of the three settings, namely, ON, OFF, and CUSTOM, can be set has been described. However, there may be a case where, as the options for "Launch of Extended Application" on the screen illustrated in FIG. 3, only ON and OFF are present. In this case, the OS does not perform the process from S703 to S707. On the other hand, in the process illustrated in FIG. 7, there may be a case where, as the launch setting of the extended application 203, only CUSTOM is set. In this case, options for "Launch of Extended Application" need not be present on the screen illustrated in FIG. 3, and the OS performs the process in S702 and the process from S703 to S707 but does not perform the process in S701. That is, if the extended application is launched under an appropriate condition, all of the steps need not be performed.

Figure 10A:
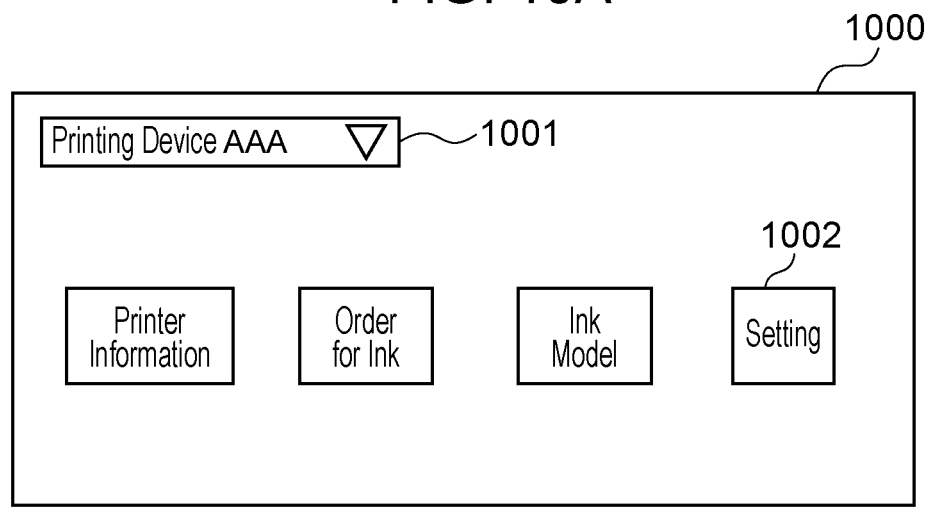
FIGS. 10A and 10B are diagrams illustrating example screens provided by the extended application.
Figure 10B:
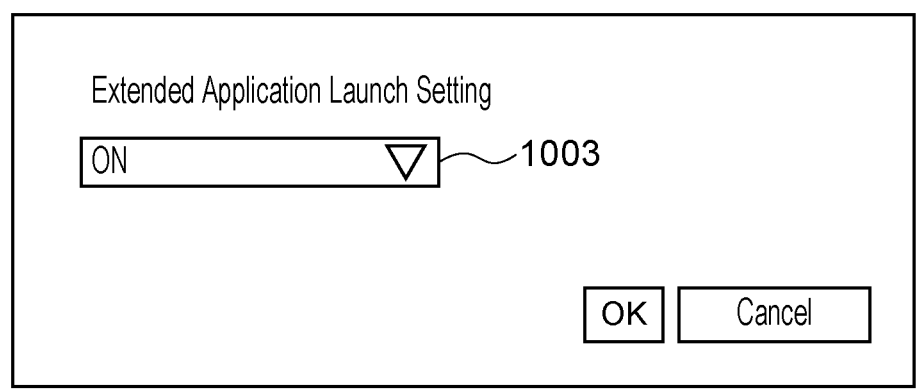

In this embodiment, the method has been described in which the launch setting for the extended application 203 is performed by using the screen illustrated in FIG. 3; however, other methods may be employed. For example, when the extended application 203 is independently launched, a screen 1000 as illustrated in FIG. 10A may be displayed. A display item 1001 is used to accept selection of a target printing device. A display item 1002 is used to display a screen illustrated in FIG. 10B. The user may use a display item 1003 on the screen illustrated in FIG. 10B to specify a method for launching the extended application 203. In a case where the display item 1002 on the screen illustrated in FIG. 10A is selected, the screen illustrated in FIG. 3 may be displayed. In the display item 1001 on the screen illustrated in FIG. 10A, a printing device registered in the associated print data generation software 202 is displayed. In a case where a plurality of printing devices are registered in the print data generation software 202, the plurality of printing devices are displayed as options. In a case where "Printer Information" is selected on the screen illustrated in FIG. 10A, state information regarding a printing device selected in the display item 1001 (the state of the printing device, the amount of remaining ink of the printing device, etc.) is displayed. The state information regarding the printing device may be obtained via the print data generation software 202. Address information regarding a printing device selected in the display item 1001 may be obtained from the print data generation software 202, and the extended application 203 may use the obtained address information to obtain state information regarding the printing device. In a case where "Order for Ink" is selected, a Web browser may be launched to display a Web page for ordering an ink. In a case where "Ink Model" is selected, information regarding inks that can be used in a printing device selected in the display item 1001 may be displayed.

Second Embodiment

In the first embodiment, print setting information that serves as launch conditions is registered, and the OS launches the extended application 203 only in a case where a matched setting is set, thereby realizing the configuration in which the extended application 203 is launched only when the user needs the extended features. However, in the first embodiment, the registered launch conditions need to be compared with print setting information set by the user at each launch timing, and therefore, the process for checking settings takes time, which is an issue. Specifically, as a larger number of launch conditions are set, it takes longer for the OS to determine whether the print setting information matches the launch conditions. Accordingly, in this embodiment, a method for reducing the time taken to determine whether to launch the extended application 203 is proposed. In this embodiment, a common extended application launch setting for triggering launch of the extended application 203 is included in print setting information. Then, the print setting screen extension unit 204 of the extended application 203 changes the extended application launch setting on the basis of print setting information set by the user, and a launch instruction is given accordingly. Although the extended application 203 is offered from each vendor, the extended application launch setting described above is set in common from the extended application 203 from any vendor. Accordingly, when launching the extended application 203, the OS needs to, for example, only refer to the extended application launch setting in the print setting information. As a result, information to be referred to by the OS can be reduced, and the time taken to determine whether to launch the extended application 203 can be reduced accordingly.

Figure 8:
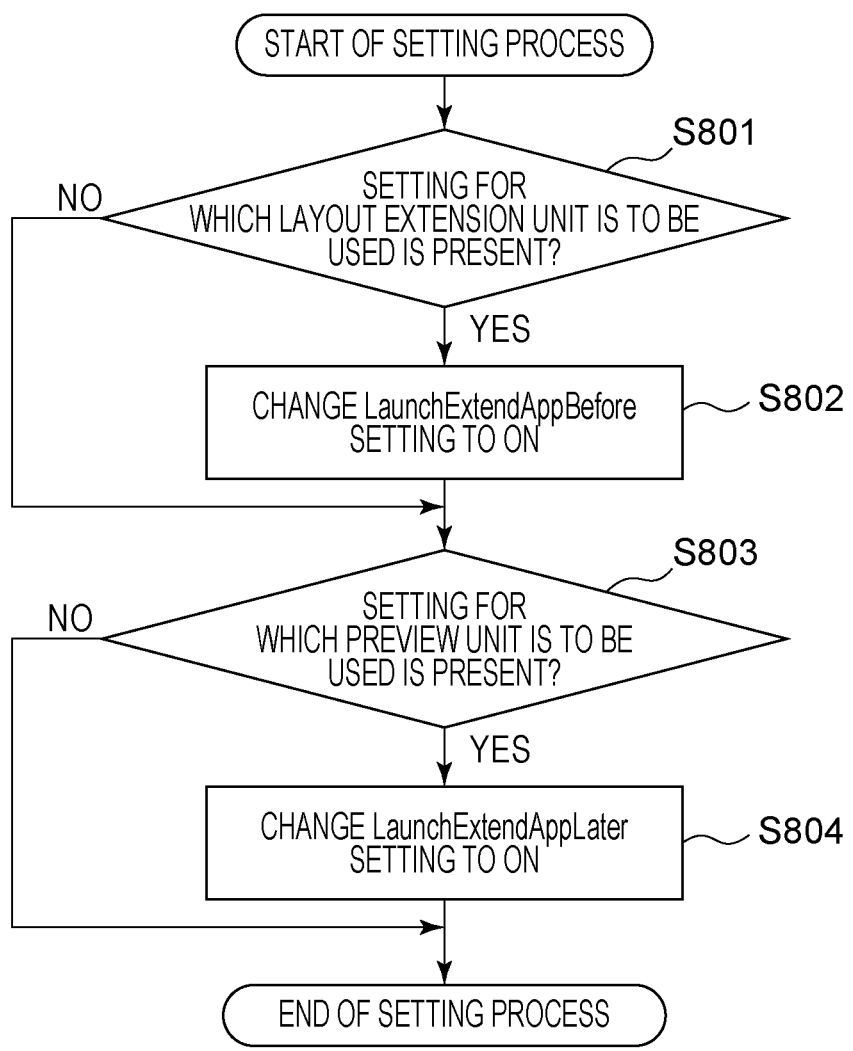
FIG. 8 is a flowchart of a launch setting process for the extended application.

FIG. 8 is an example flowchart illustrating a process for setting the extended application launch setting by the print setting screen extension unit 204. The process illustrated in FIG. 8 may be performed at a timing at which "OK" button is pressed on the screen illustrated in FIG. 3. Alternatively, the process illustrated in FIG. 8 may be performed each time print setting information is changed on the screen illustrated in FIG. 3.

Here, as the extended application launch setting, two settings, namely, LaunchExtendAppBefore indicating that the extended application 203 is to be launched before launch of the print data generation software 202 and LaunchExtendAppLater indicating that the extended application 203 is to be launched after launch of the print data generation software 202, are provided. In the extended application launch setting, ON or OFF can be set for each of the two settings, and setting ON indicates that the extended application 203 is to be launched at a corresponding timing. In this embodiment, the extended application launch setting has two settings, and determination as to whether to launch the extended application 203 before or after launch of the print data generation software 202 is performed. However, a configuration may be employed in which a single setting is used to determine whether to launch the extended application 203 before or after launch of the print data generation software 202 on the basis of a set value. In this case, as the set value, three values need to be provided, namely, a value indicating that the extended application 203 is to be launched before launch of the print data generation software 202, a value indicating that the extended application 203 is to be launched after launch of the print data generation software 202, and a value indicating that the extended application 203 is not launched. In a case where the extended application 203 is to be launched only before launch of the print data generation software 202 or only after launch of the print data generation software 202, determination can be performed on the basis of whether the set value of the single setting is ON or OFF.

First, the print setting screen extension unit 204 checks whether print setting information set by the user includes a setting for which the layout extension unit 205 is to be used (S801). In a case where the extended application 203 is to be launched in accordance with conditions the same as those in the registration information illustrated in FIG. 6, the print setting screen extension unit 204 checks whether two-page printing or four-page printing is set for the page layout setting.

In a case where it is determined that a setting for which the layout extension unit 205 is to be used is present in the print setting information, the print setting screen extension unit 204 sets the LaunchExtendAppBefore setting to ON (S802).

Next, the print setting screen extension unit 204 checks whether the print setting information set by the user includes a setting for which the preview unit 206 is to be used (S803). In a case where the extended application 203 is to be launched in accordance with conditions the same as those in the registration information illustrated in FIG. 6, the print setting screen extension unit 204 checks whether ON is set for the print preview setting. In a case where it is determined that a setting for which the preview unit 206 is to be used is present in the print setting information, the print setting screen extension unit 204 sets the LaunchExtendAppLater setting to ON (S804). Accordingly, the extended application launch setting can be appropriately performed in accordance with the print setting information set by the user.

Figure 9:
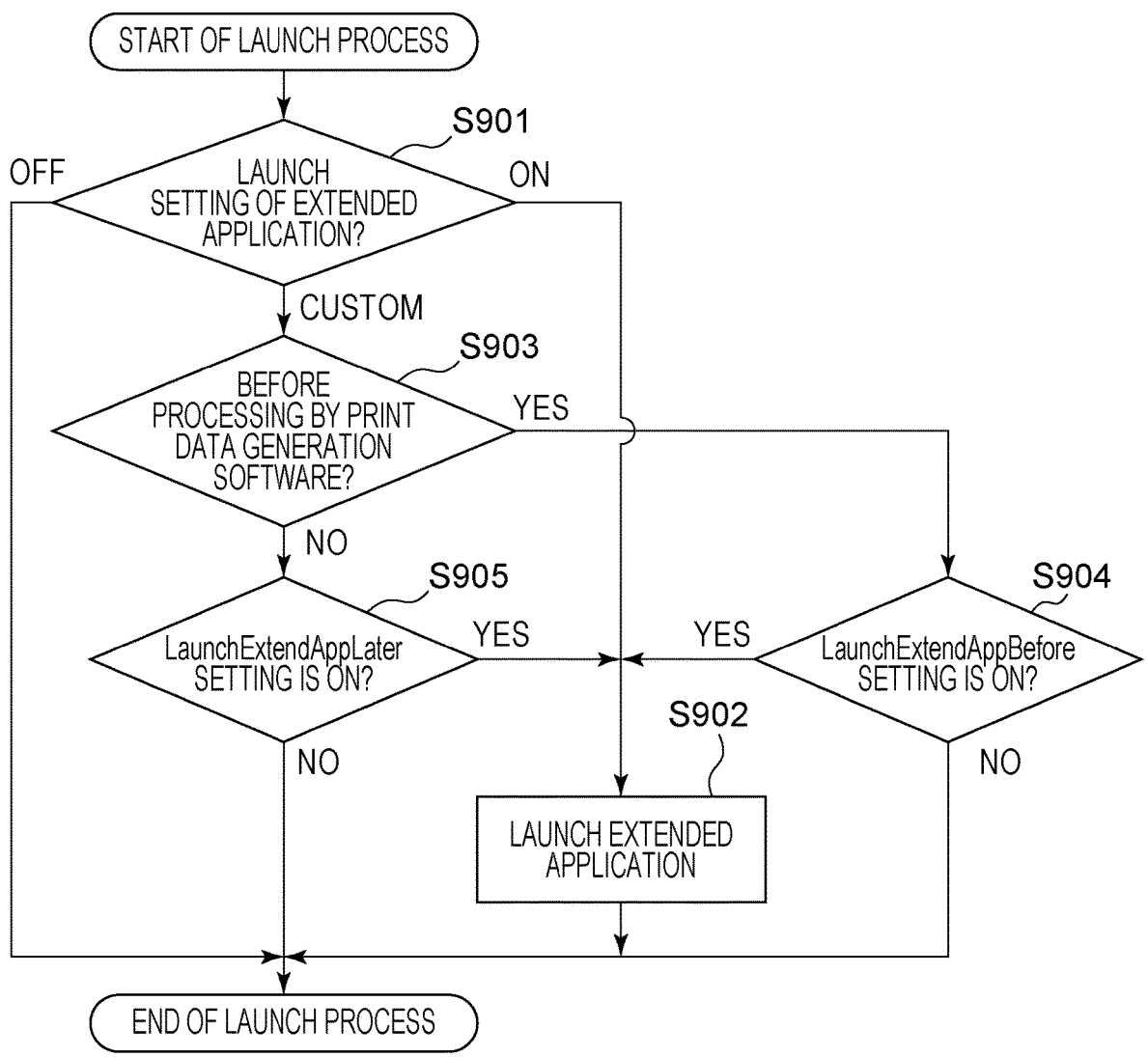
FIG. 9 is a flowchart of a launch process for the extended application in a second embodiment.

FIG. 9 is a flowchart of an example of the launch process for the extended application 203 in the second embodiment. The OS launches the extended application 203 at an appropriate timing on the basis of the extended application launch setting set by the print setting screen extension unit 204. Also in this embodiment, a description is given under the assumption that the OS is responsible for launch of the extended application 203; however, a configuration may be actually employed in which a launch module that is included in the OS is present.

The process to be performed in a case where determination in S901 in FIG. 9 results in ON or OFF is the same as that illustrated in FIG. 7, and therefore, a description thereof will be omitted, and the process in step S903 and the subsequent steps in a case where CUSTOM is set is described.

In the case where the launch setting of the extended application 203 is set to CUSTOM, the OS determines whether the launch timing is before processing by the print data generation software 202 (S903). In a case where the launch timing is before processing, the flow proceeds to S904, and in a case where the launch timing is after processing, the flow proceeds to S905. In S904, the OS checks whether ON is set for the LaunchExtendAppBefore setting indicating whether to launch the extended application 203 before launch of the print data generation software 202. In a case where ON is set, the flow proceeds to S902, and the OS launches the extended application 203. In a case where OFF is set, the OS does not launch the extended application 203, and the launch process ends.

In S905, the OS checks whether ON is set for the LaunchExtendAppLater setting indicating whether to launch the extended application 203 after launch of the print data generation software 202. In a case where ON is set, the flow proceeds to S902, and the OS launches the extended application 203. In a case where OFF is set, the OS does not launch the extended application 203, and the launch process ends. As in the first embodiment, the OS outputs intermediate data to the print data generation software 202 and outputs print data to the printing device 102.

In this embodiment, part of launch determination for the extended application 203 based on print settings is performed at the time of printing, and the extended application launch setting is set, so that the load of the launch determination process performed by the launch module can be reduced. Accordingly, part of the determination process is performed at the time of print setting, and the time taken from a print start instruction given by the user until print completion can be made shorter than that in the first embodiment.

Other Embodiments

The above-described embodiments can be implemented by performing the following process. A recording medium to which program code of software for realizing the functions of the above-described embodiments is recorded is supplied to a system or an apparatus. Then, a computer (or a CPU or a micro-processing unit (MPU)) of the system or the apparatus reads and executes the program code stored in the recording medium. Accordingly, the above-described functions can be realized. In this case, the program code read from the recording medium realizes the functions of the above-described embodiments, and the recording medium that stores the program code constitutes the present invention.

As the recording medium for supplying the program code, for example, a flexible disk, a hard disk, an optical disk, a magneto-optical disk, a compact disc read-only memory (CD-ROM), a compact disc recordable (CD-R), a magnetic tape, a nonvolatile memory card, a ROM, or a digital versatile disc (DVD) can be used.

When the computer executes the read program code, not only the functions of the above-described embodiments are realized. A case where an OS, etc. running on the computer performs part or all of the actual processing in accordance with instructions of the program code and the functions of the above-described embodiments are realized by the processing is also included in the present invention.

Further, the program code read from the recording medium may be written to a memory included in a function extension board that is inserted into the computer or a memory included in a function extension unit that is connected to the computer. Then, a CPU, etc. included in the function extension board or a CPU, etc. included in the function extension unit may perform part or all of the actual processing. With the processing, the functions of the above-described embodiments are realized.

With the present invention, convenience of print processing can be increased.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2018-125043, filed Jun. 29, 2018, which is hereby incorporated by reference herein in its entirety.

What is claimed is:

1. An information processing apparatus having an application configured to output content data, the information processing apparatus comprising:
   a print setting screen unit configured to cause a display to display a setting screen before a print job is transmitted to a printing apparatus, wherein the setting screen is provided by an extended application, the extended application is obtained via a network based on identification information obtained from the printing apparatus being connected to the information processing apparatus, print data generation software associated with the extended application is usable for a printing apparatus from a first print vendor and is usable for a printing apparatus from a second print vendor different from the first print vendor, and the print job is generated based on the content data and print setting information set using the setting screen of the extended application;
   a receiving unit configured to receive an instruction; and
   a preview unit configured to display a preview screen in a case where the instruction is received, wherein the preview screen is a screen different from the setting screen and is displayed after the setting screen is displayed,
   wherein the preview unit is provided by the extended application, and
   wherein the print setting screen unit, the receiving unit, and the preview unit are implemented by at least one processor of the information processing apparatus.

2. The information processing apparatus according to claim 1, wherein
   in a case where the print setting information includes a layout setting, the extended application is launched before the print data generation software generates the print job, and
   in a case where the print setting information includes a preview setting, the extended application is launched after the print data generation software has generated the print job.

3. The information processing apparatus according to claim 2, wherein the layout setting indicates the number of pages to be arranged on a side of a sheet.

4. The information processing apparatus according to claim 1, wherein the print data generation software is included in advance in an operating system.

5. The information processing apparatus according to claim 1, wherein the print job is processed by an inkjet printer.

6. The information processing apparatus according to claim 1, wherein an operating system is installed on the information processing apparatus and the information processing apparatus obtains the print data generation software.

7. The information processing apparatus according to claim 6, wherein the information processing apparatus obtains the extended application using the identification information obtained from the printing apparatus connected to the information processing apparatus.

8. The information processing apparatus according to claim 1, further comprising:
   a first determination unit configured to perform a determination process for determining whether automatic setting is set as information about launch of the extended application; and
   a second determination unit configured to, in a case where it is determined that the information about launch of the extended application is set to be automatic and where the determination process is performed after the print data generation software generates print data, determine whether a preview setting is set in the print setting information,
   wherein, in a case where it is determined by the second determination unit that the preview setting is included in the print setting information, the extended application is launched and the preview screen is displayed, and
   wherein the first determination unit and the second determination unit are implemented by at least one processor of the information processing unit.

9. A control method to be performed in an information processing apparatus having an application configured to output content data, the control method comprising:
   causing a display to display a setting screen before a print job is transmitted to a printing apparatus, wherein the setting screen is provided by an extended application, the extended application is obtained via a network based on identification information obtained from the printing apparatus being connected to the information processing apparatus, print data generation software associated with the extended application is usable for a printing apparatus from a first print vendor and is usable for a printing apparatus from a second print vendor different from the first print vendor, and the print job is generated based on the content data and print setting information set using the setting screen of the extended application;

receiving an instruction; and displaying a preview screen in a case where the instruction is received, wherein the preview screen is a screen different from the setting screen and is displayed after the setting screen is displayed, wherein displaying the preview screen is performed by the extended application.

10. The control method according to claim 9, wherein in a case where the print setting information includes a layout setting, the extended application is launched before the print data generation software generates the print job, and in a case where the print setting information includes a preview setting, the extended application is launched after the print data generation software has generated the print job.

11. The control method according to claim 10, wherein the layout setting indicates the number of pages to be arranged on a side of a sheet.

12. The control method according to claim 9, wherein the print data generation software is included in advance in an operating system.

13. A non-transitory computer-readable medium storing executable instructions, which when executed by one or more processors of an information processing apparatus having an application configured to output content data, cause the information processing apparatus to perform operations comprising:

causing a display to display a setting screen before a print job is transmitted to a printing apparatus, wherein the setting screen is provided by an extended application, the extended application is obtained via a network based on identification information obtained from the printing apparatus being connected to the information processing apparatus, print data generation software associated with the extended application is usable for a printing apparatus from a first print vendor and is usable for a printing apparatus from a second print vendor different from the first print vendor, and the print job is generated based on the content data and print setting information set using the setting screen of the extended application;

receiving an instruction; and displaying a preview screen in a case where the instruction is received, wherein the preview screen is a screen different from the setting screen and is displayed after the setting screen is displayed, wherein displaying the preview screen is performed by the extended application.

14. The non-transitory computer-readable medium according to claim 13, wherein in a case where the print setting information includes a layout setting, the extended application is launched before the print data generation software generates the print job, and in a case where the print setting information includes a preview setting, the extended application is launched after the print data generation software has generated the print job.

15. The non-transitory computer-readable medium according to claim 14, wherein the layout setting indicates the number of pages to be arranged on a side of a sheet.

16. The non-transitory computer-readable medium according to claim 13, wherein the print data generation software is included in advance in an operating system.

17. The non-transitory computer-readable medium according to claim 13, wherein the print job is processed by an inkjet printer.

18. The non-transitory computer-readable medium according to claim 13, wherein an operating system is installed on the information processing apparatus and the information processing apparatus obtains the print data generation software.

19. The non-transitory computer-readable medium according to claim 18, wherein the information processing apparatus obtains the extended application using the identification information obtained from the printing apparatus connected to the information processing apparatus.

* * * * *